ically used, it is in amounts ranging from about 0.1 to about 15 percent by weight, preferably about 1.0 to about 10 percent, and more preferably about 1.0 to about 8 percent by weight, based on the weight of the final product produced. ENB is preferred.

United States Patent [19]
Eisinger et al.

[11] Patent Number: 6,011,128
[45] Date of Patent: Jan. 4, 2000

[54] PROCESS FOR CONDITIONING A GAS-PHASE REACTOR TO PRODUCE AN ETHYLENE-PROPYLENE OR ETHYLENE-PROPYLENE-DIENE RUBBER

[75] Inventors: Robert Steven Eisinger; Kiu Hee Lee, both of Charleston; Fathi David Hussein, Cross Lanes; Daniel Paul Zilker, Jr., Charleston, all of W. Va.

[73] Assignee: Union Carbide Chemicals & Plastics Technology Corporation, Danbury, Conn.

[21] Appl. No.: 09/099,881

[22] Filed: Jun. 17, 1998

[51] Int. Cl.⁷ .............................. C08F 2/34; C08F 236/20
[52] U.S. Cl. .................... 526/130; 526/90; 526/129; 526/143; 526/144; 526/281; 526/282; 526/283; 526/336; 526/348; 526/901
[58] Field of Search ................... 526/63, 129, 130, 526/281, 282, 283, 308, 335, 336, 339, 901, 90, 143, 144

[56] References Cited

U.S. PATENT DOCUMENTS

| | | | |
|---|---|---|---|
| 4,343,926 | 8/1982 | Caumartin et al. | 526/901 X |
| 5,106,927 | 4/1992 | Rifi et al. | 526/901 X |
| 5,264,506 | 11/1993 | Eisinger et al. | 526/194 |
| 5,376,743 | 12/1994 | Baker et al. | 526/168 X |

*Primary Examiner*—Fred Teskin
*Attorney, Agent, or Firm*—B. L. Deppenbrock; P. W. Leuzzi

[57] ABSTRACT

There is provided process for producing an ethylene-alpha-olefin polymer at a polymerization reaction temperature in excess of the softening temperature of the polymer in a gas-phase fluidized-bed reactor in the presence of a polymerization catalyst and wherein the polymerization reaction is conducted in the presence of an inert particulate material, the improvement comprising: commencing polymerization by polymerizing an ethylene propylene rubber having a crystallinity ranging from about 4 to 18 percent as measured by differential scanning calorimetry.

8 Claims, 1 Drawing Sheet

PROCESS FOR CONDITIONING A GAS-PHASE REACTOR TO PRODUCE AN ETHYLENE-PROPYLENE OR ETHYLENE-PROPYLENE-DIENE RUBBER

FIELD OF THE INVENTION

A process for improving gas-phase reactor operability for the production of an ethylene-propylene rubber or ethylene-propylene-diene rubber when employing an inert particulate material is provided. More particularly, there is provided a conditioning process that is applied prior to production of the desired ethylene-propylene rubber using a polymerization catalyst in the presence of an inert particulate material.

BACKGROUND OF THE INVENTION

Until recently, it was not possible to produce sticky polymers such as ethylene-propylene and ethylene-propylene-diene rubbers (EPRs and EPDMs), collectively referred to as ethylene-propylene rubbers, in a gas-phase polymerization under commercially attractive conditions.

U.S. Pat. No. 4,994,534 made commercial production feasible by teaching that sticky polymers, such as ethylene-propylene rubbers, can be produced in a gas-phase polymerization process using an inert particulate material (or fluidization aid) at temperatures at or above the polymer softening or sticking temperature. The use of an inert particulate material renders a sticky polymer such as ethylene-propylene rubber non-sticky so that it can be fluidized in gas-phase operation. Sufficient quantities of inert particulate material (carbon black and other carbon materials, silica, clays, talc, and other materials which are inert under reaction conditions) are added to the reactor to permit production of sticky polymers having an outer shell comprised mostly of inert particulate material. It is believed that in the polymer particle so made, the outer shell comprised mostly of inert particulate material renders the core comprised mostly of polymer, and hence the whole of the particle non-sticky. Levels of fluidization aids ranging from 0.3 to 80 weight percent, based on the weight of the polymer plus fluidization aid, and having a mean particle size from about 0.01 to about 10 microns have been effective in such polymerizations. It should be pointed out that the neat polymer (absence of inert particulate material) is sticky, but after it is contacted with fluidization aid the polymer does not behave as a sticky polymer, that is, it is non-sticky and flowable.

However, while making gas-phase production of sticky polymers commercially attractive, inert particulate materials introduce their own problems to the polymerization process. These polymerizations of elastomers are significantly different from and much more difficult to conduct than gas-phase polymerizations to produce polyethylene and polypropylene polymers.

For example, the inert particulate materials can act as fines which can travel through the reaction system (distributor plate, cycle piping, heat exchanger(s), compressors, etc.) and foul it. The use of inert particulate materials such as silica and clay can result in the build-up of static electricity which negatively affects operability of the reaction system. Also, inadequate or improperly dispersed inert particulate material can result in formation of skins and sheets of polymer in the expanded section of the fluidized-bed reactor. The polymer skins or sheets can fall into the fluidized bed and appear as agglomerates in the elastomeric product as well as cause distributor plate plugging. Skin thermocouples in the reactor can register temperature irregularities, thereby indicating the presence of skins. But, if in response to these thermocouple readings, the operator increases the level of inert particulate material, reactor shutdown could result because of too much inert particulate material in the reactor. These phenomena associated with the use of inert particulate materials when polymerizing sticky polymers such as ethylene propylene polymers are particularly troublesome.

Accordingly, it is a principal object of the present invention to continuously produce ethylene propylene rubber containing inert particulate material in a gas-phase, fluidized-bed reactor over long periods of time with good reactor operability. It is another object to produce ethylene-propylene rubber which is substantially free of agglomerates. A further object of the invention is to reduce the required amount of inert particulate material required for ethylene-propylene rubber production while achieving the above objectives. These and other objectives will be apparent from the following description of the invention.

SUMMARY OF THE INVENTION

Figure 1:
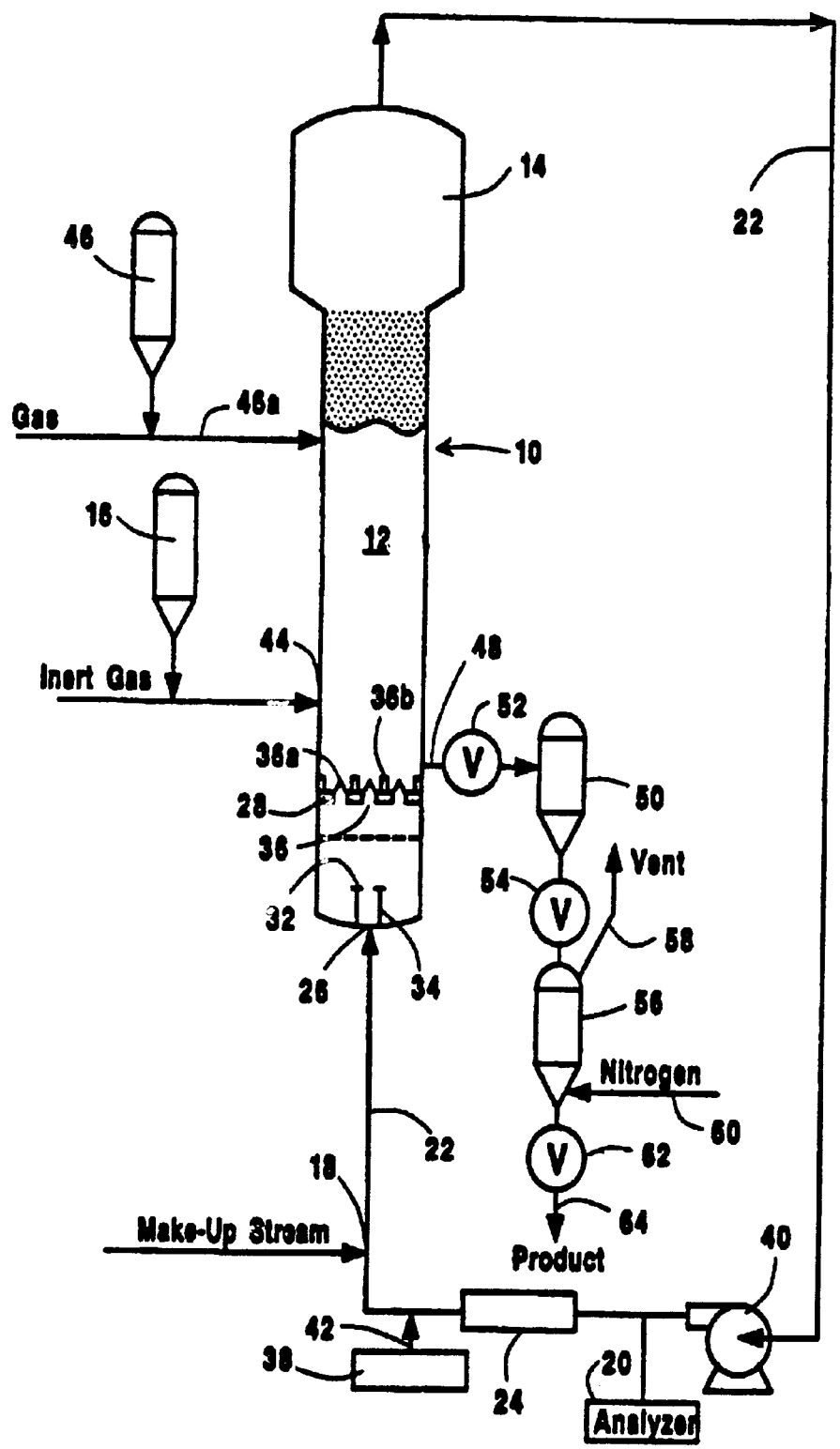
FIG. 1 illustrates a gas-phase, fluidized bed polymerization scheme for producing sticky polymers such as ethylene-propylene rubbers using inert particulate materials.

The present invention provides a process for producing an ethylene-alpha-olefin polymer at a polymerization reaction temperature in excess of the softening temperature of the polymer in a gas-phase, fluidized-bed reactor in the presence of a polymerization catalyst and wherein the polymerization reaction is conducted in the presence of an inert particulate material, the improvement comprising: commencing polymerization by producing a polymer having a crystallinity ranging from about 4 to 18 percent as measured by differential scanning calorimetry.

In a preferred embodiment of the process, the improvement comprises: initially conditioning said reactor for about 12 to about 36 hours in the presence of about 5 to 20 wt % inert particulate material by (1) producing a partially crystalline ethylene-propylene rubber having about 16 to 26 wt % propylene, about 0 to 8 wt % diene, and a gum Mooney viscosity of at least about 40 when the polymerizing catalyst is one which produces a homogeneous product or (2) polymerizing a partially crystalline ethylene-propylene rubber having about 24 to 39 wt % propylene and about 0 to 8 wt % diene and a gum Mooney viscosity of at least about 40 when the polymerizing catalyst is one which produces a heterogeneous product.

DESCRIPTION OF THE INVENTION

Polymerization Processes

Gas-phase, fluidized bed polymer production is very well known in the art as shown, for example, by the disclosure appearing in U.S. Pat. Nos. 4,379,758; 4,383,095; 4,876,320; 4,994,534; 5,317,036; and 5,453,471. The production of polymers in gas-phase stirred reactors is also well known in the art as exemplified by the process and equipment descriptions appearing in U.S. Pat. No. 3,256,263. Gas-phase polymerizations can be conducted in condensed mode, induced condensed mode, and/or liquid monomer mode, all of which are known in the art.

Polymers Produced

Polymers produced can include ethylene-propylene rubber including ethylene-propylene-diene rubber. The amount of propylene can range from about 20 to about 50 wt % based upon total polymer (inert material-free). The amount of diene, when employed, can range from about 0.2 to about 10 wt %, based on total polymer. The polymers can contain conjugated or non-conjugated dienes having from about 4 to about 20, preferably 4 to 12, carbon atoms. The diene employed can be selected from those listed in U.S. Pat. No. 5,317,036. Preferred dienes include 2-methyl-pentadiene, 1,5-hexadiene, 5-vinyl-2-norbornene, 1,7-octadiene, 7-methyl-1,6-octadiene, dicyclopentadiene, and mixtures thereof. Most preferably, the diene is ethylidene norbornene (ENB). The polymers are produced in the presence of an inert particulate material (carbon black, silica, clay, talc, etc.), as taught for example in U.S. Pat. No. 4,994,534. Preferably the inert particulate material is carbon black.

Conditioning Process

It has been discovered that fouling of the reactor walls and subsequent accumulation of agglomerates in the fluidized bed can be substantially avoided by initially operating the reactor at startup under a specified range of conditions before performing a transition to those conditions at which the desired product is made. If no conditioning is employed and the reactor conditions at startup are set to produce a sticky product, agglomerates will occur in the product at some point in time during the continuous polymerization and will persist even if inert particulate material levels are subsequently increased. This condition results ultimately in the polymerization having to be discontinued after a relatively short operation period. When conditioning is used at startup, agglomerates do not form and the polymerization can proceed for longer periods of time (i.e., for weeks).

Conditioning at startup is conducted in the following manner. An ethylene-propylene rubber polymerization reaction is commenced at a temperature in excess of the softening temperature of the polymer in a gas-phase, fluidized-bed reactor in the presence of a polymerization catalyst and an inert particulate material. Initially at startup, a partially crystalline polymer is produced in the presence of about 5 to 20 wt % (preferably about 8 to 15 wt %) inert particulate material for about 12 to about 36 hours, preferably about 12 to 26 hours. Generally this partially crystalline product should be produced for no less than about 12 hours. Most preferably, it is produced for about 24 hours. Producing it for longer periods (more than about 36 hours) does not improve reactor operability and results in a larger amount of off-grade or undesired polymer.

Any polymerization catalyst can be employed. Typically the catalyst employed in the previously enumerated processes contains a transition metal (including metallocenes) component and an organoaluminum component. Preferred catalysts are those having a titanium, zirconium, or vanadium component or a combination thereof. The catalyst can be supported or unsupported. It can be used as a prepolymer, spray-dried, or as a liquid (e.g., in a solution). Conventional techniques can be employed for impregnating the catalyst onto a catalyst support such as those disclosed in U.S. Pat. No. 4,521,723. The preferred support is a silica as described in U.S. Pat. No. 5,264,506. Desirably, the silica support has an average particle size of from about 60 to 200 (preferably about 70 to 140) microns; no more than about 30 percent by weight silica should have a particle size below about 44 microns. Further, the silica support has an average pore diameter of greater than about 100 Angstrom units, preferably greater than about 150 Angstrom units. It is also desirable for the silica support to have a surface area greater than about 200 square meters per gram. The support should be dry, that is, free of adsorbed water. Drying of the silica is carried out by heating it at a temperature of about 600 degrees C.

When the polymerizing catalyst employed is one which produces a homogeneous (non-blocky or random) polymer, the partially crystalline ethylene-propylene rubber produced is one having about 16 to 26 wt % (preferably about 18 to 24 wt %) propylene, about 0 to 8 wt % (preferably about 0.1 to 3 wt %) diene, the remainder being ethylene, and a gum Mooney viscosity (large rotor, 1+4 minutes, 125° C., gum rubber) of at least about 40, preferably about 60 to 80.

The description of gum Mooney viscosity (or ML 1+4 @ 125° C.) of a melt-massed product polymer containing inert particulate material (e.g., carbon black (CB) such as N-650) is as follows:

M is the Mooney viscosity,

L indicates the use of a large rotor, 1 is the time in minutes that the polymer specimen was permitted to warm in the machine before starting the motor, +4 is the time in minutes after starting the motor at which time the reading is taken, 125° C. is the temperature of the test.

In order to convert the measured Mooney of the product to that for the raw (gum) polymer, the following equation has been found suitable in the range of 0–50 phr CB, 10–100 polymer ML 1+4 @ 125° C.:

$$M(\text{polymer}) = [M(\text{product}) + (0.191 * CB)]/[1 + (0.0206 * CB)]$$

where CB is concentration in the product, phr (parts per hundred of rubber).

When the polymerizing catalyst is one which produces a heterogeneous (blocky) product the partially crystalline ethylene-propylene rubber produced initially at startup is one having about 24 to 39 wt % (preferably about 30 to about 39 wt %) propylene and 0 to 8 wt % (preferably about 0.1 to about 3 wt %) diene, the remainder being ethylene. Again, the gum Mooney viscosity (large rotor, 1+4 minutes, 125° C., gum rubber) is at least about 40, preferably about 60 to 80 determined as set forth above.

In general, polymerizing catalysts which produce substantially either a heterogeneous product or a homogeneous product are known in the art. For example, U.S. Pat. Nos. 4,508,842; 4,988,783; and 5,096,869 disclose the use of particular vanadium catalysts for making heterogeneous product, while U.S. Pat. Nos. 5,342,907 and 5,332,793 relate to certain vanadium catalysts for producing homogeneous product. In general, metallocenes (especially those which are single-site) produce a homogeneous copolymer or terpolymer. It is only when two or more single-site catalysts are present that the probability of the production of a heterogeneous product arises, since it would be coincidental for two catalysts to have the same comonomer and molecular weight responses. Also, a single-site catalyst which undergoes chemical reduction in oxidation state (e.g., a Ti metallocene that is reduced from +3 to +2, possibly due to presence of certain alkyl aluminum compounds) could produce a heterogeneous product. A metallocene or metallocene-like precursor which becomes multi-site during activation and/or polymerization is disclosed, for example, in Idemitsu's JPO 8/231622.

The crystallinity of the polymer produced during the conditioning step is due largely to the ethylene (C2) content. Crystallinity (first heat) is measured by differential scanning calorimetry (DSC) and is based on the following empirical relationship:

Wt. % Crystal. (DSC 1st heat)=0.79 (wt. % C2)–51 In DSC, using a granular polymer sample, the glass transition and percent crystallinity of an ethylene-propylene rubber is measured. The method measures the total heat of associated with the exothermic transition which takes place as the sample is cooled from the melt to below its glass transition. The glass transition and percent crystallinity are determined from a heat analysis between −120 degrees C. and 165 degrees C. The glass transition is determined at the inflection point temperature occurring on the slope of the glass transition between approximately −100 degrees C. and −25 degrees C. The percent crystallinity is calculated from the total heat associated with the melt endotherm occurring between approximately 20 degrees C. and 150 degrees C. The total heat in Joules per gram is converted to percent using the arbitrary conversion factor of 276 Joules per gram for 100% crystalline polyethylene. By partial crystallinity is meant the polymer produced during conditioning has a crystallinity ranging from about 4 to 18 percent by weight.

After the reactor has been producing the conditioning polymer for 12 to 26 hours, a transition is performed to the desired product using procedures known in the art. Typically, during transitioning the fluidized bed level is lowered slowly to 30 to 85 percent of the normal operating level, while maintaining a constant production rate. Preferably during this period sonic cleaning devices such as those in U.S. Pat. No. 5,461,123 are employed and activated at regular intervals. After the bed reaches the desired lower level, typically about 50 percent of the normal operating level, the conditions in the reactor are adjusted to make the desired product. Once the new set of conditions are achieved in the reactor, and the product reaches specifications, the bed level is returned to the normal operating level to complete the transition.

While not wishing to be bound by any theory, it is believed that the conditioning of the reactor with the partially crystalline polymer of the process serves to coat the reactor walls, particularly in the expanded section of the reactor. Conditioning probably consists of a thin coating of polymer covered with inert particulate material (e.g., carbon black) such that forming particles of elastomeric material do not attach to the walls and/or expanded section of the reactor. Possibly the coating is loose such that when a polymer particle strikes the wall, it would pull away some of the inert particulate material such as carbon black, but the particle does not remain on the wall. For this action to occur, the inert particulate material may need a light adhesive to adhere it to the walls and the polymer used during the conditioning period provides this adhesion thereby avoiding agglomerate generation. Agglomerates as used herein means particles greater than a No. 6 screen hole (about ⅛ inch). Conditioning when using an inert particulate material such as silica may be shorter in duration as compared to carbon black. It is believed that this shorter period is because silica enters the reactor with an electrostatic charge on it. Free silica in the fluidized bed can then migrate to the walls and electrostatic forces assist the adhesion provided by the conditioning polymer. Also, the use of silica as fluidization aid gives better scrubbing action of the reactor walls than carbon black.

A fluidized-bed reaction system which is particularly suited to production of sticky polymers by the practice of the conditioning and polymerization process of the present invention is illustrated in the drawing. With reference thereto and particularly to FIG. 1, the reactor 10 comprises a reaction zone 12 and a velocity reduction zone 14.

In general, the height-to-diameter ratio of the reaction zone can vary in the range of about 2.7:1 to about 5:1. The range, of course, can vary to larger or smaller ratios and depends upon the desired production capacity. The cross-sectional area of the velocity reduction zone 14 is typically within the range of about 2.5 to about 2.9 multiplied by the cross-sectional area of the reaction zone 12.

The reaction zone 12 includes a bed of growing polymer particles, formed polymer particles and a minor amount of catalyst all fluidized by the continuous flow of polymerizable and modifying gaseous components in the form of make-up feed and recycle fluid through the reaction zone. To maintain a viable fluidized bed, the superficial gas velocity (SGV) through the bed must exceed the minimum flow required for fluidization which is typically from about 0.2 to about 0.8 ft/sec. depending on the average particle size of the product. Preferably the SGV is at least 1.0 ft/sec. above the minimum flow for fluidization or from about 1.2 to about 6.0 ft/sec. Ordinarily, the SGV will not exceed 6.0 ft/sec. and it is usually no more than 5.5 ft/sec.

Particles in the bed help to prevent the formation of localized "hot spots" and to entrap and distribute the particulate catalyst through the reaction zone. Accordingly, on start up, the reactor is charged with a seed bed of particulate polymer particles before gas flow is initiated. Such particles may be the same as the polymer to be formed or different. When different, they are withdrawn with the desired newly formed polymer particles as the first or conditioning product. Eventually, a fluidized bed consisting of desired polymer particles supplants the start-up bed of conditioning polymer.

The catalysts used are often sensitive to oxygen. Thus the catalyst used to produce polymer in the fluidized bed is preferably stored in a reservoir 16 under a blanket of a gas, such as nitrogen or argon, which is inert to the stored material.

Fluidization is achieved by a high rate of recycled gas to and through the bed, typically on the order of about 50 to about 150 times the rate of feed of make-up fluid. This high rate of recycled gas provides the requisite superficial gas velocity necessary to maintain the fluidized bed. The fluidized bed has the general appearance of a dense mass of individually moving particles as created by the percolation of gas through the bed. The pressure drop through the bed is equal to or slightly greater than the weight of the bed divided by the cross-sectional area. It is thus dependent on the geometry of the reactor.

Make-up fluid can be fed at point 18 to recycle line 22 although it is also possible to introduce makeup fluid between heat exchanger 24 and velocity reduction zone 14 in recycle line 22 or directly to the fluidized bed. The composition of the recycle stream is measured by a gas analyzer 20 and the composition and amount of the make-up stream is then adjusted accordingly to maintain an essentially steady-state gaseous composition within the reaction zone.

The gas analyzer is a conventional gas analyzer which operates in conventional manner to indicate recycle stream composition which is then used to regulate the feed. The gas analyzer 20 can be positioned to receive gas from a point between the velocity reduction zone 14 and the dispenser 38, preferably after the compressor 40.

To ensure complete fluidization, the recycle stream and make-up stream are returned through recycle line 22 to the reactor at reactor base 26 below the bed. Preferably there is a gas distributor plate 28 above the point of return to aid in fluidizing the bed uniformly and to support the solid particles prior to start-up or when the system is shut down. The stream passing upwardly through the bed absorbs the heat of reaction generated by the polymerization reaction.

The portion of the gaseous stream flowing through the fluidized bed which did not react in the bed becomes the recycle stream which leaves the reaction zone 12 and passes into a velocity reduction zone 14 above the bed where a major portion of the entrained particles drop back into the bed thereby reducing solid particle carryover.

The recycle stream exiting the compressor is then returned to the reactor at its base 26 and thence to the fluidized bed through gas distributor plate 28. A fluid flow deflector 32 is preferably installed at the inlet to the reactor to prevent contained polymer particles from settling out and agglomerating into a solid mass and to maintain entrained or to re-entrain any liquid or solid particles which may settle out or become disentrained.

The fluid flow deflector comprises an annular disc supported at a stand-off distance above the base 26 by the spacers 34 and divides the entering recycle stream into a central upward flow stream and an upward peripheral annular flow stream along the lower side walls of the reactor. The flow streams mix and then pass through the holes or ports 36 of the distributor plate 28 and the caps 36a and 36b, secured to the upper surface of the distributor plate, and eventually into the fluidized bed.

The temperature of the bed is basically dependent on three factors: (1) the rate of catalyst injection which controls the rate of polymerization and the attendant rate of heat generation; (2) the temperature of the gas recycle stream and (3) the volume of the recycle stream passing through the fluidized bed. Of course, the amount of liquid introduced into the bed either with the recycle stream and/or by separate introduction also affects the temperature since this liquid vaporizes in the bed and serves to reduce the temperature. Normally the rate of catalyst injection is used to control the rate of polymer production. The temperature of the bed is controlled at an essentially constant temperature under steady state conditions by constantly removing the heat of reaction. By "steady state" is meant a state of operation where there is no change in the system with time. Thus, the amount of heat generated in the process is balanced by the amount of heat being removed and the total quantity of material entering the system is balanced by the amount of material being removed. As a result, the temperature, pressure, and composition at any given point in the system is not changing with time. A temperature gradient will exist in the bottom of the bed in a layer or region extending above the distributor plate, e.g., for about 6 to about 12 inches, as a result of the difference between the temperature of the inlet fluid and temperature of the remainder of the bed. However, in the upper portion or region above this bottom layer, the temperature of the bed does not change significantly and is at the maximum desired temperature.

Good gas distribution plays an important role in the efficient operation of the reactor. The fluidized bed contains growing and formed particulate polymer particles, as well as catalyst particles. As the polymer particles are hot and possibly active, they must be prevented from settling, for if a quiescent mass is allowed to exist, any active catalyst present will continue to react and can cause fusion of the polymer particles resulting, in an extreme case, in the formation of a solid mass in the reactor which can only be removed with a great difficulty and at the expense of an extended downtime. Since the fluidized bed in a typical commercial size reactor may contain many thousand pounds of solids at any given time, the removal of a solid mass of this size would require a substantial effort. Diffusing recycle fluid through the bed at a rate sufficient to maintain fluidization throughout the bed is, therefore, essential.

For operation in condensing mode, any fluid inert to the catalyst and reactants and which, if a liquid, will volatilize under the conditions present in the fluidized bed, can also be present in the recycle stream. Other liquid materials can be employed, if desired, in amounts that are adsorbed on or absorbed in solid matter in the bed. Other materials, such as catalyst activator compounds, if utilized are preferably added to the reaction system downstream from compressor 40. Thus the materials may be fed into the recycle system from dispenser 38 through line 42 as shown in FIG. 1.

The fluid bed reactor may be operated at pressures of up to about 1000 psig. The reactor is preferably operated at a pressure of from about 250 to about 600 psig, with operations at the higher pressures in such ranges favoring heat transfer since an increase in pressure increases the unit volume heat capacity of the gas. The catalyst is injected intermittently or continuously into the bed at a desired rate at a point 44 which is above the distributor plate 28. Preferably, the catalyst is injected at a point in the bed where good mixing with polymer particles occurs. Injecting the catalyst at a point above the distributor plate is an important feature for satisfactory operation of a fluidized bed polymerization reactor. Since catalysts are highly active, injection of the catalyst into the area below the distributor plate may cause polymerization to begin there and eventually cause plugging of the distributor plate. Injection into the fluidized bed aids in distributing the catalyst throughout the bed and tends to preclude the formation of localized spots of high catalyst concentration which may result in the formation of "hot spots". Injection of the catalyst into the reactor is preferably carried out in the lower portion of the fluidized bed to provide uniform distribution and to minimize catalyst carryover into the recycle line where polymerization may begin and plugging of the recycle line and heat exchanger may eventually occur. A gas which is inert to the catalyst, such as nitrogen or argon, is preferably used to carry the catalyst into the bed.

Inert particulate materials can be introduced above the fluidized bed or fed into the fluidized bed or below the distributor plate. A lower concentration of inert particulate material is employed when inert particulate material is introduced above the bed. The inert particulate materials are introduced into the reactor from Vessel 46 through line 46a.

The rate of polymer production in the bed depends on the rate of catalyst injection and the concentration of monomer (s) in the recycle stream. The production rate is conveniently controlled by simply adjusting the rate of catalyst injection.

Under a given set of operating conditions, the fluidized bed is maintained at essentially a constant height by withdrawing a portion of the bed as product at the rate of formation of the particular polymer product. Complete instrumentation of both the fluidized bed and the recycle stream cooling system is, of course, useful to detect any temperature change in the bed so as to enable either the operator or a conventional automatic control system to make a suitable adjustment in the temperature of the recycle stream or adjust the rate of catalyst injection.

On discharge of particulate polymer product from the reactor 10, it is desirable, and preferable, to separate fluid from the product. There are numerous ways known to the art to accomplish this. One system is shown in the drawings. Thus, fluid and product leave the reactor 10 at point 48 and enter the product discharge tank 50 through a valve 52 which is designed to have minimum restriction to flow when opened, e.g., a ball valve. Positioned below product discharge tank 50 is a conventional valve 54 with the latter being adapted to provide passage of product into the product surge tank 56. The product surge tank 56 has venting means illustrated by line 58 and gas entry means illustrated by line

60. Also positioned at the base of product surge tank 56 is a discharge valve 62 which, when in the open position, discharges product for conveying to storage through line 64.

All references cited herein are incorporated by reference.

Whereas the scope of the invention is set forth in the appended claims, the following examples illustrate certain aspects of the present invention. The examples are set forth for illustration and are not to be construed as limitations on the invention, except as set forth in the claims. All parts and percentages are by weight unless otherwise specified.

EXAMPLES

In each example, a gas-phase fluidized-bed reactor was started to produce EPDM. In this process, various reaction components were continuously fed to the reactor and polymer product was semi-continuously withdrawn. The reaction components included monomers (e.g., ethylene, propylene, ENB), hydrogen, catalyst components, and a fluidization aid (e.g., carbon black, CB).

In Examples 1–6, the reactor was operated at a pressure of 300 psig and a temperature of 50° C. An ethylene partial pressure of 90 psi was maintained. Hydrogen was fed at a rate to maintain the molar ratio of hydrogen to ethylene in the gas-phase at 0.0013. Ethylidene norbornene (ENB) was fed at a rate to maintain about 5 wt % in the reactor, product basis. The catalyst system consisted of three components. The active component was $VCl_3$ complexed with tetrahydrofuran. This material was deposited on silica gel to obtain a loading of 2.2 wt % vanadium. This precursor was reduced with diethyl aluminum chloride (DEAC), leaving 3.5 wt % DEAC on the catalyst. The average particle size of the silica gel was 84 to 112 microns. Cocatalyst was triisobutyl aluminum (TIBA), fed as a 10 wt % solution in isopentane. It was fed at a rate to achieve a TIBA concentration in the product of about 3000–5000 ppmw. A promoter, chloroform, was diluted to 10 wt % in isopentane and fed to the reactor to maintain a gas-phase concentration of about 60 ppmv. The fluidization aid was type N-650 carbon black beads from Cabot Corporation. It was fed at a rate to maintain a concentration in the product of about 25 to 40 wt %. Catalyst was fed at a rate to produce about 2.5 lb of product per cubic foot of fluidized bed per hour.

In order to make a product with the desired low crystallinity, the gas-phase molar ratio of propylene to ethylene was maintained at 1.1, except if there was a conditioning period. The product typically contained about 42 wt % propylene, 3 wt % ENB, and a Mooney viscosity of about 60 (ML (1+4, 125° C., gum).

In Examples 1 and 2, there was no reactor conditioning period.

Example 1 (Comparative)

Prior to introducing catalyst to the reactor, the concentrations of monomers and hydrogen were brought to those conditions at which the final product would be made. In particular, the gas-phase molar ratio of propylene to ethylene was brought to 1.1. The gas-phase molar ratio of hydrogen to ethylene was brought to 0.0013. The superficial gas velocity was 2.3 ft/s. After catalyst was introduced to the reactor, the composition of the polymer was 44 wt % propylene and 4.1 wt % ENB.

During subsequent operation, agglomerates (particles larger than No. 6 screen, larger than about ⅛ inch) occurred in the product leaving the reactor. The amount of agglomerates ranged from 13 to 35 wt % based on polymer production rate. The run lasted 1.6 days and was terminated because of fallen sheets of polymer.

Example 2 (Comparative)

Example 2 consisted of a series of ten trials to produce EPDM. During the trials, catalyst particle size, superficial gas velocity, and fluidized bed height were varied. Average catalyst particle size was either 44 microns or 83 microns. Superficial gas velocities ranged from 1.4 to 2.6 ft/s. There was no reactor conditioning. In each case, the gas-phase concentrations were set to produce a low-crystallinity product with more than 40 wt % propylene, 2–4 wt % ENB, and an aim Mooney viscosity of 60. The molar gas-phase ratio of propylene to ethylene was 1.0. Operating conditions and catalyst were otherwise similar to those of Example 1.

Nine of the ten trials ended prematurely, generally in less than 3 days. In each of the nine instances, high levels of agglomerates occurred in the product and fallen sheets were a cause of shutdown. The tenth trial had to be terminated for other reasons.

Example 3 (Comparative)

In this example, the reactor was conditioned but perhaps not long enough. Most reactor operating conditions were similar to that of Example 1. Superficial gas velocity was 1.7 ft/s. The major difference was that propylene and hydrogen concentrations in the gas-phase at startup were lower. For the first 8 hours after reaction was initiated, the gas-phase molar ratio of propylene to ethylene was 0.7 to 0.8. For the next 16 hours, this ratio was 0.9. Then, the ratio was increased over a 6-hour period to the target level for low-crystallinity product, 1.1. Similarly, the gas-phase molar ratio of hydrogen to ethylene was kept low for the first 24 hours at 0.00096 to 0.00114. Then, it was increased to 0.0013.

After about 8 hours of reaction, the product being produced had a composition of 35 wt % propylene 3.5 wt % ENB, and Mooney viscosity of 57. After gas-phase concentrations were brought to their target levels, the product composition was 46 wt % propylene, 5 wt % ENB, and Mooney viscosity of 60. The level of agglomerates in the product was low for the first half of the trial but eventually increased to 25 wt %. The trial lasted 5.5 days.

Example 4

Reactor operating conditions were similar to that of Example 3. However, at startup, the gas-phase molar ratio of propylene to ethylene was maintained at 0.7 for a longer period, 30 hours. The gas-phase molar ratio of hydrogen to ethylene was held at 0.0013 for the entire trial. After 16 hours of reaction, the product had a composition of 24 wt % propylene and 2 wt % ENB. After 28 hours, it was 37 wt % propylene, and 4.5 wt % ENB, and a Mooney of 68. After lining out at target conditions, the composition was 41 wt % propylene, 4.5 wt % ENB, and Mooney of 64.

Agglomerates remained low during this trial. They averaged 3 wt % and never exceeded 9 wt %. The trial was carried out for 4.2 days. Agglomerates were low when the test was terminated in order to carry out a different experiment.

Example 5

In this example, a catalyst which produces an EPDM polymer which features more homogeneous incorporation of monomers is employed. The use of a conditioning period allows production of EPDM without generation of excessive agglomerates for an extended period, three weeks in this example.

The catalyst consists of vanadium tris acetylacetonate, which is deposited on silica gel after the vanadium compound is dissolved in tetrahydrofuran. There is 2.5 wt % vanadium in the supported catalyst. Average particle size of the catalyst was 83 microns. Cocatalyst is diethyl aluminum chloride (DEAC), fed as a 20 wt % solution in isopentane to the reactor. It is fed at such a rate that the DEAC concentration in the polymer, including carbon black, is 5600 ppmw. The promoter is ethyl trichloroacetate, fed as a 20 wt % solution in isopentane. Its feed rate is equivalent to 1600 ppmw in the black polymer.

The reactor is operated at a superficial gas velocity of 1.5 ft/s. The fluidization aid is Type N-650 carbon black, fed at a rate to produce EPDM containing 15 wt % carbon black. Reactor pressure is 400 psig and temperature is 35° C. Prior to introduction of catalyst to the reactor, ethylene partial pressure is 90 psi, the gas-phase molar ratios of propylene to ethylene and of hydrogen to ethylene are 1.0 and 0.06, respectively. These ratios are maintained for 24 hours after reaction begins. Then, these ratios are gradually changed over the next 8 hours to about 2.5 and 0.04.

The composition of the product made during reactor conditioning was 22 wt % propylene, 1.2 wt % ENB, and a Mooney viscosity of 70–80. Carbon black level was 12 phr. The composition of the target product following conditioning was 33 wt % propylene, 2 wt % ENB, and Mooney viscosity of 60. Carbon black level was 20 phr.

Agglomerates remained low throughout the 21-day trial. They averaged less than 2 wt %.

Example 6

In this example, reactor conditioning again permitted an extended period of operation without generation of excessive agglomerates. The catalyst system was similar to that of Example 5 except for the cocatalyst. The cocatalyst consisted of a mixture of DEAC and triethyl aluminum (TEAL) in molar ratios of 5:1 and 2:1. The mixtures were diluted in isopentane to a concentration of 20 wt %. The cocatalyst was fed to the reactor at a rate equivalent to 6500 ppmw in the black EPDM product.

Superficial gas velocity was 1.4 ft/s. Reactor pressure was 400 psig and temperature was 40° C. . The reactor was conditioned for 24 hours under the following conditions. The DEAC/TEAL molar ratio was 2:1. Ethylene partial pressure was 90 psi. The gas-phase molar ratio of propylene to ethylene was 0.9. The molar ratio of hydrogen to ethylene in the gas-phase was 0.024. Composition of the EPDM made during the conditioning period was 21 wt % propylene, 1.1 wt % ENB, and Mooney viscosity of 66. Following the 24-hour conditioning period, the gas composition was changed to produce several polymers having low crystallinity. The compositions of these products ranged from 26–34 wt % propylene, 1.8 to 4.5 wt % ENB, and 60–70 Mooney viscosity. Agglomerates remained low, averaging less than 1 wt % during this 41-day trial.

What is claimed is:

1. A process for producing an ethylene-alpha-olefin polymer at a polymerization reaction temperature in excess of the softening temperature of the polymer in a gas-phase fluidized-bed reactor in the presence of a polymerization catalyst and wherein the polymerization reaction is conducted in the presence of an inert particulate material, the improvement comprising: commencing polymerization by producing a polymer having a crystallinity ranging from about 4 to 18 weight percent as measured by differential scanning calorimetry.

2. The process of claim 1 wherein the improvement comprises: initially conditioning said reactor for about 12 to about 36 hours in the presence of about 5 to 20 wt % inert particulate material by (1) producing a partially crystalline ethylene propylene rubber having about 16 to 26 wt % propylene, about 0 to 8 wt % diene, and a gum Mooney viscosity of at least about 40 when the polymerization catalyst is one which produces a homogeneous product or (2) producing a partially crystalline ethylene-propylene rubber having about 24 to 39 wt % propylene and about 0 to 8 wt % diene and a gum Mooney viscosity of at least about 40 when the polymerization catalyst is one which produces a heterogeneous product.

3. The process of claim 2 wherein (1) when the catalyst is one which produces a homogeneous product, the reactor is conditioned by producing a partially crystalline ethylene-propylene rubber having about 18 to 24 wt % propylene and about 0.1 to 3 wt % diene or (2) when the catalyst is one which produces a heterogeneous product, the reactor is conditioned by producing a partially crystalline ethylene propylene rubber having about 30 to 39 wt % propylene and about 0.1 to 3 wt % diene.

4. The process of claim 3 wherein the gum Mooney viscosity ranges from about 60 to 80.

5. The process of claim 4 wherein about 8 to 15 wt % inert particulate material is employed and the partially crystalline ethylene-propylene rubber is produced for about 12 to 26 hours.

6. The process of claim 2 wherein the diene is selected from the group consisting of 2-methyl-pentadiene, 1,5-hexadiene, 5-vinyl-2-norbornene, ethylidene norbornene, 1,7-octadiene, 7-methyl-1,6-octadiene, dicyclopentadiene, and mixtures thereof; and the inert particulate material is selected from carbon black, silica, talc, clay, and mixtures thereof.

7. The process of claim 6 wherein the diene is ethylidene norbornene; and the inert particulate material is selected from the group consisting of carbon black, silica, and mixtures thereof.

8. The process of claim 1 wherein the catalyst has a metal component selected from the group consisting of titanium, zirconium, vanadium, and mixtures thereof.

* * * * *